March 13, 1973   C. A. SMITH   3,720,161
BALER FEEDER WITH MATERIAL ACCUMULATION
PREVENTION MEATS AT THE OUTBOARD END
Filed Dec. 7, 1971
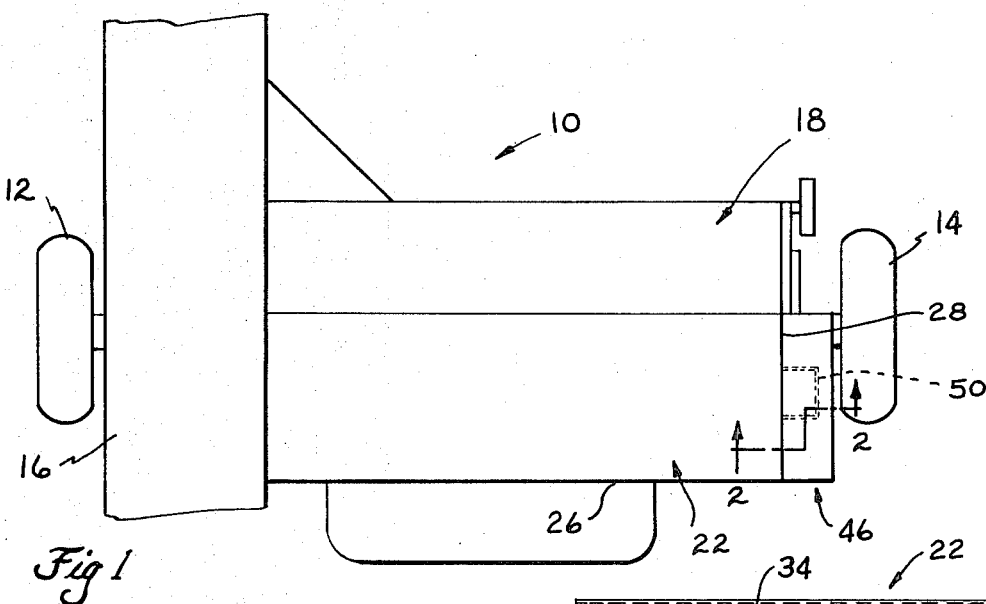
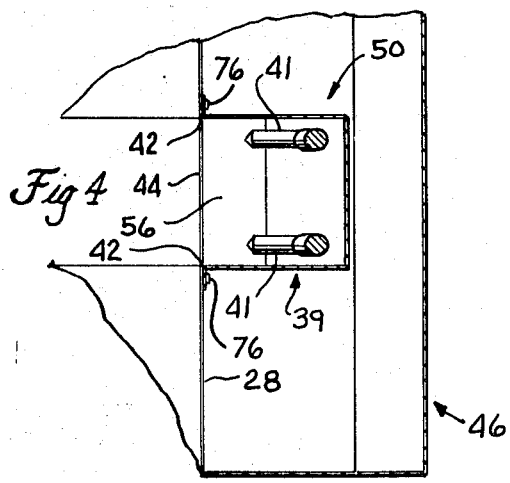
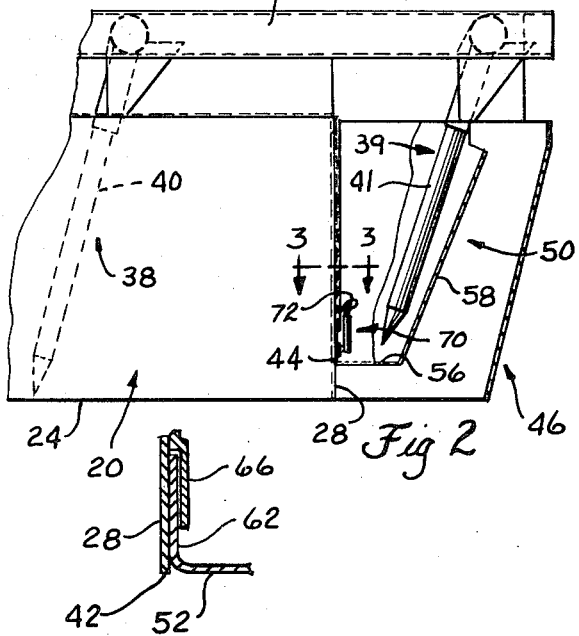
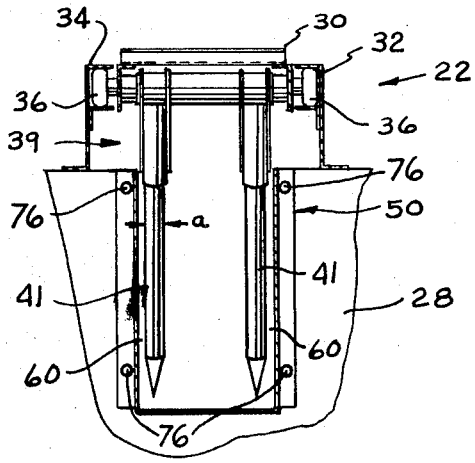
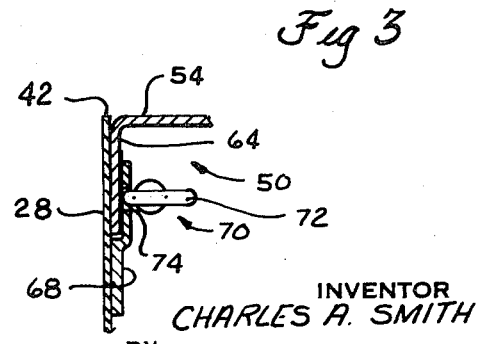
INVENTOR
CHARLES A. SMITH
BY
John C. Thompson
ATTORNEY United States Patent Office 3,720,161
Patented Mar. 13, 1973

3,720,161
BALER FEEDER WITH MATERIAL ACCUMULATION PREVENTION MEANS AT THE OUTBOARD END
Charles A. Smith, New Holland, Pa., assignor to Sperry Rand Corporation, New Holland, Pa.
Continuation-in-part of abandoned application Ser. No. 846,665, Aug. 1, 1969. This application Dec. 7, 1971, Ser. No. 205,645
Int. Cl. B30b 15/30
U.S. Cl. 100—189                                     6 Claims

ABSTRACT OF THE DISCLOSURE

A shield for the outermost set of feeder fingers of a baler, the shield being so designed to prevent the accumulation of crop material at the outer end of the crop material receiving chamber. The baler is of the type having a longitudinally extending bale case and a transverse feeding mechanism which has a plurality of sets of feeder fingers which reciprocate inwardly towards the bale case to feed material into the bale case and outwardly therefrom upon a return stroke. The outer side wall of the crop material receiving chamber is provided with an aperture through which the outermost set of feeder fingers pass on their return stroke, the opening being of a width and depth only slightly greater than the width and depth of the feeder fingers. The shield which prevents material accumulation is mounted on the outer surface of the outer side wall adjacent the aperture and has an internal width equal to the width of the aperture and a sloping outer wall which is disposed at an angle greater than the angle of repose for the crop material which is to be fed into the bale case, the lower portion of the outer wall being disposed in close proximity to the lower ends of the outermost feeder fingers. The upper surface of the bottom wall of the shield is at the same level as the bottom of the aperture.

CROSS REFERENCE TO RELATED APPLICATIONS

This application is a continuation-in-part of co-pending application Ser. No. 846,665, filed Aug. 1, 1969, now abandoned.

FIELD OF THE INVENTION

This invention relates generally to agricultural equipment and more particularly to balers of the type having a longitudinally extending bale case and a transversely extending feeding mechanism which feeds hay and other crop material into the bale case, the crop material in the bale case subsequently being formed into bales of hay or the like. The feeding mechanism to which this invention relates is of the type having a reciprocal carriage carrying a plurality of sets of depending feeder fingers which are reciprocated inwardly toward the bale case on a feeding stroke and outwardly from the bale case on a return stroke.

BACKGROUND OF THE INVENTION

While there are many patents showing the general type of feeding mechanism to which the present relates, the following patents are considered representative of the state of the art: Nolt et al. 3,040,508 patented June 26, 1962; McDuffie et al. 3,068,784 patented Dec. 18, 1962, and Sturla et al. 3,489,080 patented Jan. 13, 1970. These balers are propelled forwardly over the ground and crop material is picked up from the ground and delivered to a crop material receiving chamber. Mounted above the crop material receiving chamber is a feeding mechanism which reciprocates towards and away from a bale case. Crop material will be fed into the bale case during movement of the feeding mechanism towards the bale case. The feeder mechanism includes sets of feeder fingers which are pivotally mounted on a feed carriage. The feeder fingers are pivoted to swing upwardly on the retraction stroke of the carriage. This permits the feeder fingers to travel over the crop delivered by the pickup to the crop material receiving chamber on the retraction stroke and permits the fingers to swing downwardly on the feed stroke to catch the crop and move it towards the bale case. This action is acceptable for the set of feeder fingers nearest the bale case, however, for the set of feeder fingers furthermost from the bale case difficulties can be encountered on the completion of the reaction stroke. For example, if the outermost set of feeder fingers stay entirely within the feeding area the outboard end set of fingers tend to remain in the raised position and then do not grasp on the forward or inward feed stroke and this accumulates crop material at the outboard end. This is objectionable since it reduces the amount of crop delivered to the bale case by the feed fingers and the effective length of the feeder. Also, hay may accumulate to such an extent as to interfere with the proper operation of the carriage and feeder fingers and may require the operator of the baler to stop at frequent intervals to clean out the accumulated hay.

In order to provide for a more effective operation of this class of baler feeders it has been customary to provide an opening on the other wall of the crop material receiving chamber, the outermost set of feeder fingers passing through this outer wall towards the completion of its retraction stroke. A somewhat schematic representation of this type of construction is best shown in the Sturla et al. Pat. 3,489,080. By providing such an opening, the outermost feeder fingers have a better opportunity to drop to their lower working position, and, if the area outside of the crop material receiving chamber is open to the ground any crop material dragged outwardly by the outermost crop fingers on the retraction stroke may drop to the ground and thus permit continuous operation without buildup of crop material in the outermost ends of the crop material receiving chamber.

Mowever, in practice, it is not practical to build a baler in the manner shown in the right hand side of FIG. 1 of the Sturla et al. patent as it is necessary to shield the outer end of the reciprocating feeder to prevent undue risk to the operator of the baler and others from the reciprocating feeder. Therefore, it is customary to provide a feeder shield for the outer end of the feeder, the feeder shield being disposed outwardly of the outer wall of the crop material receiving chamber. Representative examples of such shields are shown in the Nolt et al. Pat. 3,040,508 and the McDuffie Pat. 3,068,784. These shields may be open at their bottom in the manner shown in the aforesaid McDuffie et al. patent. In this design the crop material conveyed outwardly of the crop material receiving chamber by the feeder fingers on their retraction stroke may fall onto the ground. On the other hand the shield may be closed at its bottom in the manner shown in the Nolt et al. Pat. 3,040,508.

It has been found over a number of years of test experience with balers of the type shown in the aforesaid Nolt and McDuffie patents that material may accumulate either within the shield, that is to say between the shield and the outer walls of the crop material receiving chamber, or within the outer ends of the bale case, particularly when baling "difficult" crops such as chopped corn stalks. Such an accumulation of material will adversely affect the operation of the baler and will require the operator of the baler to stop on occassion to clean out the accumulated material.

OBJECTS AND SUMMARY OF THE INVENTION

The object of this invention is to provide means at the outboard wall of the crop material feeding chamber on a baler that prevents accumulation of the crop material at the outboard end.

More specifically, it is an object of this invention to provide improved shielding means at the outboard end of the crop material receiving chamber, the improved shielding means preventing the accumulation of crop material at the outboard end.

Another object of this invention is to provide means at the outboard end of a feeder with a reciprocating carriage and pivotally mounted fingers that avoid accumulation of crop material without requiring a material redesign of either the baler or the carriage and feeder fingers.

Another object of this invention is to provide means to prevent the accumulation of crop material adjacent the outboard wall of a crop material receiving chamber that is inexpensive and readily adaptable to present balers.

A further object of this invention is to provide improved shielding means to prevent crop accumulation at the outboard end, the improved shielding means being in the form of a shield which is easily mounted and removed from balers without requiring material redesign of the baler.

In summary, the above and other objects of this invention are obtained by providing improved shielding means which enclose the outermost set of fingers of the baler feeding means, the shield being of a width and depth equal to the width and depth of the opening in the outboard wall of the crop material receiving chamber and so dimensioned (along with the opening in the outboard wall) so as to be disposed relatively near to the outer feeder fingers as they complete their retraction stroke and start their feeding stroke. The outermost wall of the shielding means is disposed at an angle greater than the angle of repose of the crop material and its lower inner surface is disposed closely adjacent to the outer feeder fingers when they are in their normal working position at the end of the retraction stroke.

These and other objects and advantages of this invention will be apparent to those skilled in the art after a consideration of the following detailed description taken in conjunction with the accompanying drawings, in which the preferred form of this invention is illustrated.

BRIEF DESCRIPTION OF THE DRAWINGS

FIG. 1 is a plan view of a portion of a baler of the type having a longitudinally extending bale case and a transversely extending crop material receiving chamber, the receiving chamber having a reciprocal carriage carrying pivotally mounted feeding fingers.

FIG. 2 is an enlarged sectional view taken generally along the line 2—2 in FIG. 1, this view being drawn generally to scale as well as the other figures in this drawing.

FIG. 3 is an enlarged sectional view taken generally along the line 3—3 in FIG. 2.

FIG. 4 is an enlarged sectional plan view of a modified version of the baler shown in FIG. 1.

FIG. 5 is an end view, partially in section, of the construction shown in FIG. 4.

DETAILED DESCRIPTION OF THE DRAWINGS

In the following description right-hand and left-hand reference is determined by standing to the rear of the baler and facing in the direction of travel.

Referring first to FIG. 1, a baler, indicated generally at 10, is fragmentarily illustrated, the baler including a frame supported by left and right wheels 12 and 14, respectively. The baler 10 has a longitudinally extending bale case 16 mounted on the frame and a transversely extending pickup and feeding mechanism to the right of the bale case for picking up crop material and feeding into the bale case for subsequent forming of the crop material into bales. The pickup and feed mechanism includes a pickup, indicated generally at 18, and a transversely extending crop material receiving chamber indicated generally at 20 (in FIG. 2) disposed beneath a feeding mechanism indicated generally at 22. The crop pickup picks crop material off the ground as the baler is propelled in a forward direction and delivers the crop material into the crop material receiving chamber 20. The crop material receiving chamber has a floor 24, a rear side wall 26 and an outer side wall 28. As previously mentioned the feeding mechanism or feeder is disposed above the crop material receiving chamber and the chamber 20 is open at its forward end for the reception of crop material and is also open at its left or inner end for the delivery of crop material into the bale case 16.

The feeding mechanism 22 is generally of the type described in the aforementioned McDuffie et al. patent and includes a carriage 30 (FIG. 5) reciprocally mounted between forward and rear side rails 32, 34, respectively. To this end, the carriage is provided with rollers 36 which roll within the rails 32, 34. Also mounted on the carriage are a plurality of sets of dependent feeder fingers, the inner sets being indicated generally at 38 and the outermost set at 39. Each set of feeder fingers preferably includes two spaced apart front and rear feeder fingers disposed in a longitudinally extending plane parallel to the bale case. The lower end of the feed fingers 40 of the inner sets being adapted to pass closely adjacent to the upper surface of the floor 24 of the crop material receiving chamber, and the lower end of fingers 41 of the outermost set being spaced slightly above the floor. Thus, as the carriage moves from the right to the left crop material received from the pickup 18 will be conveyed into the bale case 16. On movement in the other direction from the left to the right the feeder fingers 40, 41 are free to pivot upwardly over any crop material that may then be lying on the floor 24 of the chamber 20.

During reciprocation of the feeder from the left to the right the outermost set of feeding fingers 39 will pass through an aperture in the outer wall 28 defined by vertically extending side edges 42 (FIG. 4) as well as by its bottom edge 44. As is conventional a guard is disposed outwardly of this opening to protect the operator of the baler and others from the reciprocating fingers, this guard being indicated generally at 46. The guard 46 is conventionally open at the bottom as has been illustrated in the drawings. As noted before, crop material will occasionally be conveyed towards the right upon retraction of the feeder carriage and would be deposited upon the ground or possibly accumulate within the outer shield if suitable means were not provided to prevent material from accumulating in this critical area. To prevent such an accumulation a novel shield, indicated generally at 50, is provided, this shield being removably mounted on the outer surface of the outer side wall 28 and being disposed within the guard 46.

The shield is so dimensioned that the inner surface of side walls 52 and 54 conform in width to the width of the opening as defined by the inner edges 42 of the opening within the outer side wall; and similarly, the upper surface of the bottom wall 56 of the shield lies in substantially the same horizontal plane as the edge 44 of the opening in outer side wall 28. The outer side wall 58 of the shield 50 is disposed at an angle to the vertical, this angle being so selected that it is between the angle of repose for the crop materials which will be worked upon by the baler and the normal working angle of the outermost set 39 of feeder fingers which, as can be best seen from FIG. 2, are disposed at an angle from the vertical.

The sizing of the aperture so that it has a width and depth only slightly greater than the width and depth of the outer set of feeder fingers, the spacing of the lower inner surface of the outer wall 58 from the feeder fingers when in their normal working position, the dimensioning and placement of the inner surfaces of the shield adjacent the aperture so that inner surfaces are coextensive with the sides and bottom of the aperture, the slope angle of the outer wall of the shield, and the distance between inner surfaces of the side walls 52, 54 and the adjacent feeder fingers are important features of this invention. The preferred spacial relationships of the width of the aperture in the outer side wall 28 and the shield 50 (that is to say the distance between the adjacent or inner surfaces of the side walls 52 and 54) with respect to the feeder fingers is best illustrated in FIG. 5. As can be seen from this figure the width of the space 60 between each of the feeder fingers and its associated side wall is less than the working width "a" of the feeder finger and is preferably in the order of 7/16 of an inch. (Ideally the side wall should be spaced as close to the feeder finger as possible, however, manufacturing tolerances are such that a certain spacing is desirable to prevent the feeder fingers from engaging the sides of the opening and damaging it to such an extent that the baler and the shield of this invention will not operate satisfactorily.) Similarly, the floor or bottom wall 56 of the shield means 50 is spaced as close as practical to the bottom end of each of the feeder fingers 41 and the lower inner surface of the outer wall 58 is similarly so spaced with respect to the feeder fingers 40. It should be noted that by having the side walls or edges 42 and the bottom edge 44 of the aperture in the outer side wall spaced relatively close to the outermost set of feeder fingers a stripping action is exerted on the feeder fingers as they move out of the chamber 20 to assume the position shown in FIG. 2. By making the floor 56 of the shield 50 and the inner side walls 52 and 54 of a width equal to the width of the opening 42 no inner edges or ledges are provided within the shield means. Therefore, any crop material conveyed rearwardly into the shield 50 during the retraction stroke can freely move out of the shield on the feeding stroke, the material on the floor 56 being engaged by the lower ends of the feeder fingers. The rear wall is disposed at an angle between the angle of the outermost set of feeder fingers and the angle of repose for crop material which is to be baled in the baler. Therefore any crop material thrown against this outer wall will tend to slide down towards the bottom of the side wall. Finally, it should be noted that by having the bottom of the outer wall 58 spaced relatively close to the normal working position of the end of the outermost feeder fingers that any material brought into the shield means 50 will be subsequently conveyed outwardly.

It may be desirable to remove the shield means 50 and to this end two different forms of removable mounting are shown. In the form shown in FIGS. 2 and 3 the shield is provided with front and rear flanges 62, 64, these flanges passing between the outer side wall 28 and front and rear mounting brackets 66, 68 which are welded to the side wall 28. The mounting brackets 66 and 68 do not extend all the way to the bottom of the shield, as can be seen from FIG. 2. Mounted on the lower outer surface of at least one of the flanges, 62, 64 is a spring retaining member, indicated generally at 70 which is provided with a projection 72 which may be disposed within a hole 74 on the associated mounting bracket to hold the shield in its normal upper working position. To remove the shield, it is only necessary to unsnap the spring retainer and slide the shield through the lower opening in the guard 46.

Alternatively, the shield may be secured to the side wall 28 by screws 76 or other suitable fasteners, in the manner shown in FIGS. 4 and 5.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:
1. A baler comprising:
a longitudinally extending bale case;
a transversely extending crop material receiving chamber disposed to one side of the bale case and including a floor and an outer side wall;
a plurality of sets of feeder fingers disposed above the floor of the crop material receiving chamber and movable in unison towards and away from said bale case, the feeder fingers being disposed in a downwardly inclined position when moving towards the bale case and being free to move away from the downwardly inclined position when moving away from the bale case whereby the ends of the feeder fingers may pass over any crop material upon the floor of the crop material receiving chamber;
the outermost set of feeder fingers consisting of at least two spaced apart feeder fingers lying in a longitudinally extending plane generally parallel to the bale case;
an aperture in the outer side wall through which the outermost set of feeder fingers may pass before they complete their movement away from the bale case, the aperture having a width and depth only slightly in excess of the width and depth of the feeder fingers whereby the inner surface of the outer side walls adjacent the aperture serves to strip any material being conveyed away from the bale case from the feeder finger; and
a material accumulation prevention shield disposed outwardly of the outer side wall, the material accumulation prevention shield including spaced apart side walls, the inner surface of each being co-extensive with the associated side of the aperture in the outer side wall, and a bottom wall, the upper surface of which is co-extensive with the lower side of the aperture, and an outer wall.

2. The baler set forth in claim 1 in which the space between the inner side surfaces of the side walls of the material accumulation prevention shield are spaced away from the adjacent surface of the associated feeder finger a distance less than the working width of the feeder finger.

3. The baler set forth in claim 1 in which the outer wall is disposed at an angle greater than the angle of repose for the crop material but less than the angle of the feeder fingers when in their normal working position.

4. In a baler of the type having a bale case, a crop material receiving chamber including a floor and an outer side wall, and a feeding mechanism mounted above and extending into the crop material receiving chamber for reciprocal movement towards and away from the bale case, said feeding mechanism including a plurality of sets of pivotally mounted feeder fingers disposed normally in a downwardly inclined position when moving towards the bale case, the feeder fingers being free to pivot away from said downwardly inclined position on movement away from the bale case, the outer set of feeder fingers furthest from the bale case passing through an aperture in the outer side wall, the combination therewith: a material accumulation prevention means comprising a shield mounted adjacent the aperture in the outer side wall, said shield including spaced apart side walls extending outwardly from the outer side wall, an outer wall extending between the side walls of the shield, and a bottom wall, the bottom wall and the lower inner surface of the outer wall being disposed in relatively close proximity to the outer set of feeder fingers, and the inner surfaces of the side walls of the material accumulation prevention shield being disposed away from the adjacent surface of the associated feeder fingers a distance not greater than the working width of the associated feeder finger, whereby any material in the material accumulation prevention means will be engaged by the set of feeder fingers furthest from the bale case as they move towards the bale case.

5. The baler set forth in claim 4 in which each of the inner surfaces of the side walls of the material accumulation prevention shield is disposed away from the adjacent surface of the associated feeder finger a distance not greater than one-half inch.

6. In a baler of the type having a bale case, a crop material receiving chamber including a floor and an outer side wall, and a feeding mechanism mounted and extending into the crop material receiving chamber for reciprocal movement towards and away from the bale case, said feeding mechanism including a plurality of sets of pivotally mounted feeder fingers disposed normally in a downwardly inclined position when moving towards the bale case, the feeder being free to pivot away from said downwardly inclined position on movement away from the bale case, the feeder fingers being free to pivot away from said downwardly inclined position on movement away from the bale case, the outer set of feeder fingers furthest from the bale case passing through an aperture in the outer side wall, the combination therewith of: a material accumulation prevention means comprising a shield mounted adjacent the aperture in the outer side wall, said shield including spaced apart side walls extending outwardy from the outer side wall, an outer wall extending between the side walls of the shield, and a bottom wall, the bottom wall and the lower inner surfaces of the side walls and the outer wall being disposed in relatively close proximity to the outer set of feeder fingers whereby any material in the material accumulation prevention means will be engaged by the set of feeder fingers furthest from the bale case as they move towards the bale case, the upper surface of the bottom wall being disposed at the same level as the bottom of the aperture in the outer side wall whereby material disposed in the material accumulation prevention shield can be fed outwardly therefrom upon movement of the feeder fingers toward the bale case without passing over any ledge.

References Cited
UNITED STATES PATENTS

| | | | |
|---|---|---|---|
| 3,040,508 | 6/1962 | Nolt et al. | 56—341 |
| 3,068,784 | 12/1962 | McDuffie et al. | 100—142 |

BILLY J. WILHITE, Primary Examiner